United States Patent
Sato et al.

(10) Patent No.: US 12,410,332 B2
(45) Date of Patent: Sep. 9, 2025

(54) AQUEOUS INKJET INK COMPOSITION, PRINTED MATTER, AND INKJET PRINTING METHOD

(71) Applicant: SAKATA INX CORPORATION, Osaka (JP)

(72) Inventors: Yoichi Sato, Osaka (JP); Hirohito Maeda, Osaka (JP); Kazuki Moriyasu, Osaka (JP); Eri Ueda, Osaka (JP); Takaaki Sano, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 119 days.

(21) Appl. No.: 18/252,870

(22) PCT Filed: Jul. 13, 2021

(86) PCT No.: PCT/JP2021/026311
§ 371 (c)(1),
(2) Date: May 12, 2023

(87) PCT Pub. No.: WO2022/176228
PCT Pub. Date: Aug. 25, 2022

(65) Prior Publication Data
US 2024/0010861 A1    Jan. 11, 2024

(30) Foreign Application Priority Data
Feb. 17, 2021 (JP) ................... 2021-023397

(51) Int. Cl.
| | | |
|---|---|---|
| C09D 11/32 | (2014.01) | |
| B41J 2/01 | (2006.01) | |
| C09D 11/00 | (2014.01) | |
| C09D 11/107 | (2014.01) | |
| C09D 11/322 | (2014.01) | |

(52) U.S. Cl.
CPC ................... C09D 11/322 (2013.01)

(58) Field of Classification Search
CPC ..... C09D 11/322; C09D 11/107; C09D 11/38; B41J 2/21; B41J 2/2107
See application file for complete search history.

(56) References Cited

U.S. PATENT DOCUMENTS

| | | | |
|---|---|---|---|
| 5,948,512 A | 9/1999 | Kubota et al. | |
| 5,972,087 A | 10/1999 | Uraki et al. | |
| 6,075,069 A | 6/2000 | Takemoto | |
| 6,232,370 B1 | 5/2001 | Kubota et al. | |
| 2007/0117882 A1* | 5/2007 | Aoyama | C09D 11/322 523/160 |
| 2011/0069111 A1 | 3/2011 | Matsumoto et al. | |
| 2011/0069117 A1 | 3/2011 | Ohzeki et al. | |
| 2013/0155160 A1 | 6/2013 | Shiono | |
| 2018/0037762 A1 | 2/2018 | Sato et al. | |
| 2020/0238716 A1 | 7/2020 | Okada et al. | |
| 2021/0047531 A1 | 2/2021 | Sato et al. | |
| 2021/0130630 A1 | 5/2021 | Nishimura et al. | |

FOREIGN PATENT DOCUMENTS

| | | | |
|---|---|---|---|
| CN | 103173059 | A | 6/2013 |
| CN | 107406704 | A | 11/2017 |
| CN | 110997830 | A | 4/2020 |
| JP | 9-227812 | A | 9/1997 |
| JP | 9-286941 | A | 11/1997 |
| JP | 10-152635 | A | 6/1998 |
| JP | 2002-20656 | A | 1/2002 |
| JP | 2002-29140 | A | 1/2002 |
| JP | 2011-62999 | A | 3/2011 |
| JP | 2011-63772 | A | 3/2011 |
| JP | 2013-129708 | A | 7/2013 |
| JP | 2013-173902 | A | 9/2013 |
| JP | 2013-223958 | | 10/2013 |
| JP | 2015-137319 | A | 7/2015 |
| JP | 2018-104582 | A | 7/2018 |
| JP | 2019-1955 | A | 1/2019 |
| JP | 2020-56018 | A | 3/2020 |
| JP | 2020-116870 | A | 8/2020 |
| WO | WO 2020/054290 | A1 | 3/2020 |

OTHER PUBLICATIONS

Written Opinion of the International Searching Authority received in PCT/JP2021/026311, mailed Oct. 5, 2021.
International Preliminary Report on Patentability (IPER) received in PCT/JP2021/026311, dated Aug. 22, 2023.
Extended European Search Report in European Patent Application No. 21926657.4, mailed Mar. 14, 2024 in 6 pages.
International Search Report received in PCT/JP2021/026311 mailed Oct. 5, 2021.
Office Action received in Japanese Patent Application No. 2021-023397, May 11, 2021.
Extended European Search Report issued in corresponding European Patent Application No. 24203035.1, dated Jan. 31, 2025, in 6 pages.
Office Action issued in Chinese Patent Application No. 202180081848.X dated Jul. 12, 2025.

* cited by examiner

*Primary Examiner* — Jason S Uhlenhake
(74) *Attorney, Agent, or Firm* — KNOBBE, MARTENS, OLSON & BEAR, LLP

(57) ABSTRACT

An aqueous inkjet ink composition containing a pigment, an alkali-soluble resin, a surfactant, a water-soluble solvent, colloidal silica, and water, in which the surfactant includes a surfactant having an HLB value equal to or greater than 3 and less than 10 and a surfactant having an HLB value of 10-20 (inclusive), the water-soluble solvent has a boiling point of 170-250° C. (inclusive) at 1 atm, and the percentage of the colloidal silica in the aqueous inkjet ink composition is 0.05-2 mass % (inclusive). The aqueous inkjet ink composition has excellent storage stability, mechanical stability, discharge stability, coating film drying properties, and cissing resistance.

7 Claims, No Drawings

AQUEOUS INKJET INK COMPOSITION, PRINTED MATTER, AND INKJET PRINTING METHOD

This application is the U.S. National Phase under 35 U.S.C. § 371 of International Application PCT/JP2021/026311, filed Jul. 13, 2021, designating the U.S., and published in Japanese as WO 2022/176228 on Aug. 25, 2022, which claims priority to Japanese Patent Application No. 2021-023397, filed Feb. 17, 2021, the entire content of which is incorporated herein by reference.

TECHNICAL FIELD

The present invention relates to an aqueous inkjet ink composition, a printed matter, and an inkjet printing method.

BACKGROUND ART

An inkjet printing/recording method is a printing/recording method in which droplets of an aqueous inkjet ink composition are directly ejected from very fine nozzles and attached onto a printing/recording base material to obtain letters and images.

As such an aqueous inkjet ink composition, for example, a composition containing a pigment, an alkali-soluble resin (resin for pigment dispersion), a surfactant, a specific water-soluble solvent, water, and the like is known (Patent Documents 1 to 4). These Patent Documents disclose aqueous inkjet ink compositions having good storage stability and ejection stability. Further, an aqueous inkjet ink composition containing colloidal silica is known (Patent Document 5 to 11).

PRIOR ART DOCUMENTS

Patent Documents

Patent Document 1: JP-A-2020-56018
Patent Document 2: JP-A-2019-1955
Patent Document 3: JP-A-2018-104582
Patent Document 4: JP-A-2015-137319
Patent Document 5: JP-A-9-227812
Patent Document 6: JP-A-9-286941
Patent Document 7: JP-A-10-152635
Patent Document 8: JP-A-2002-29140
Patent Document 9: JP-A-2002-20656
Patent Document 10: JP-A-2011-62999
Patent Document 11: JP-A-2011-63772

SUMMARY OF THE INVENTION

Problems to be Solved by the Invention

Meanwhile, not only uncoated paper such as plain paper and offset paper, but also a non-absorbent print medium such as coated paper and a polyvinyl chloride sheet are used as the printing/recording base material as described above. On such a non-absorbent print medium, the permeation drying of the water-soluble solvent of an aqueous inkjet ink composition is less likely to occur, and thus there are problems that the decrease in the drying property of the coating film causes the decrease in image quality, for example, smearing, and cissing occurs on the coated surface.

The ink composition containing colloidal silica is also required to have mechanical stability that prevents aggregation of the colloidal silica during use or storage period.

The present invention has been made in view of the above circumstances, and an object of the present invention is to provide an aqueous inkjet ink composition having good storage stability, mechanical stability, ejection stability, the drying property of the coating film, and cissing resistance.

Means for Solving the Problems

That is, the present invention relates to an aqueous inkjet ink composition containing a pigment, an alkali-soluble resin, a surfactant, a water-soluble solvent, colloidal silica, and water, wherein the surfactant contains a surfactant (A) having an HLB value of 3 or more and less than 10, and a surfactant (B) having an HLB value of 10 or more and 20 or less, the water-soluble solvent has a boiling point of 170° C. or more and 250° C. or less at 1 atm, and a proportion of the colloidal silica is 0.05% by mass or more and 2% by mass or less in the aqueous inkjet ink composition.

The present invention also relates to a printed matter obtained by performing printing using the aqueous inkjet ink composition.

The present invention also relates to an inkjet printing method, including the step of printing an object to be printed on a non-absorbent print medium using the aqueous inkjet ink composition.

Effect of the Invention

Though the details of the mechanism of action of the effect in the aqueous inkjet ink composition of the present invention are partially unknown, they are presumed as follows. However, the present invention is not construed as being limited to this mechanism of action.

The aqueous inkjet ink composition according to the present invention contains a pigment, an alkali-soluble resin, a surfactant, a water-soluble solvent, colloidal silica, and water, wherein the surfactant contains a surfactant (A) having an HLB value of 3 or more and less than 10, and a surfactant (B) having an HLB value of 10 or more and 20 or less, the water-soluble solvent has a boiling point of 170° C. or more and 250° C. or less at 1 atm, and a proportion of the colloidal silica is 0.05% by mass or more and 1% by mass or less in the aqueous inkjet ink composition. Addition of the surfactant (A) having a low HLB value reduces the surface tension of the ink and suppresses entrainment of bubbles from the nozzle surface, and thus, the aqueous inkjet ink composition of the present invention has good ejection stability. Further, the surfactant (B) having a high HLB value exhibits an effect of compatibilizing the surfactant (A) with water, and thus, the aqueous inkjet ink composition of the present invention has good storage stability, election stability, and the drying property of the coating film. Further, inclusion of a specific amount of colloidal silica improves the adsorption to the surface of the base material and suppresses aggregation of droplets, and thus improves cissing resistance. Moreover, inclusion of a specific amount or less of colloidal silica improves mechanical stability.

MODE FOR CARRYING OUT THE INVENTION

The aqueous inkjet ink composition of the present invention contains a pigment, an alkali-soluble resin, a surfactant, a water-soluble solvent, colloidal silica, and water.

<Pigment>

As the pigment of the present invention, an organic pigment or an inorganic pigment used in an inkjet ink composition can be used without particular limitation.

Examples of the organic pigments include dye lake pigments, azo-based pigments, benzimidazolone-based pigments, phthalocyanine-based pigments, quinacridone-based pigments, anthraquinone-based pigments, dioxazine-based pigments, indigo-based pigments, thioindico-based pigments, perylene-based pigments, perinone-based pigments, diketopyrrolopyrrole-based pigments, isoindolinone-based pigments, nitro-based pigments, nitroso-based pigments, flavanthrone-based pigments, quinophthalone-based pigments, pyranthrone-based pigments, and indanthrone-based pigments. Examples of the inorganic pigments include carbon black, titanium oxide, zinc oxide, red iron oxide, graphite, black iron oxide, chrome oxide green, and aluminum hydroxide. The pigment may be subjected to a surface treatment using a known surface treatment agent. The pigments can be used singly or in combination of two or more types thereof.

Specific examples of the pigment based on typical hues include the following.

Examples of yellow pigments include C.I. Pigment Yellows 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, and 213.

Examples of magenta pigments include C.I. Pigment Reds 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, and 270, and C.I. Pigment Violet 19.

Examples of cyan pigments include C.I. Pigment Blues 1, 2, 3, 15, 15:1, 15:2, 15:3, 15:4, 15:6, 16, 18, 22, 27, 29, and 60.

Examples of black pigments include carbon black (C.I. Pigment Black 7).

Examples of white pigments include titanium oxide and aluminum oxide, and the white pigments may be subjected to a surface treatment using various materials such as alumina and silica.

<Alkali-Soluble Resin>

The alkali-soluble resin of the present invention is an ordinary alkali-soluble resin that can be used for pigment dispersion of inks and paints or as a binder, and is not particularly limited as long as the alkali-soluble resin can be dissolved in an aqueous medium in the presence of a basic compound. The alkali-soluble resin of the present invention is preferably a resin containing one type or two or more types of anionic groups such as a carboxyl group, a sulfonic acid group, and a phosphonic acid group (—P(=O)(OH$_2$)).

The alkali-soluble resin preferably further has a hydrophobic moiety for improving the adsorption mainly on the pigment in the molecule. Examples of the hydrophobic moiety introduced into the molecule include hydrophobic groups such as a long-chain alkyl group and an alicyclic or aromatic cyclic hydrocarbon group.

The acid value of the alkali-soluble resin is preferably 40 mg KOH/g or more, and more preferably 70 mg KOH/g or more from the viewpoint of increasing the solubility in an aqueous medium. The acid value of the alkali-soluble resin is preferably 300 mg KOH/g or less, more preferably 250 mg KOH/g or less from the viewpoint of improving the water resistance of a printed matter. The acid value is a theoretical acid value of the mg number of potassium hydroxide theoretically required to neutralize 1 g of the alkali-soluble resin arithmetically determined based on the composition of the monomer used for synthesizing the alkali-soluble resin.

The glass transition temperature of the alkali-soluble resin is preferably 0° C. or more, more preferably 10° C. or more from the viewpoint of improving the blocking resistance of a printed matter. The glass transition temperature of the alkali-soluble resin is preferably 100° C. or less, more preferably 80° C. or less from the viewpoint of improving the folding resistance of a printed matter.

The glass transition temperature of the alkali-soluble resin is a theoretical glass transition temperature determined by the following Wood equation when the alkali-soluble resin is an acrylic copolymer resin.

Wood equation: $1/Tg = W1/Tg1 + W2/Tg2 + W3/Tg3 + \ldots + Wx/Tgx$

[where, Tg1 to Tgx represent the glass transition temperature of homopolymer of each of the monomers 1, 2, 3 . . . x that constitute the alkali-soluble resin, W1 to Wx represent the polymerization fraction of each of the monomers 1, 2, 3 . . . x, and Tg represents the theoretical glass transition temperature. However, the glass transition temperature in the Wood equation is the absolute temperature.]

The glass transition temperature of the alkali-soluble resin is a theoretical glass transition temperature determined by thermal analysis when the alkali-soluble resin is a resin other than the acrylic copolymer resin. As the method of thermal analysis, as an example, the glass transition temperature can be measured in conformity with JIS K7121 (Testing Methods for Transition Temperatures of Plastics) using Pyris1 DSC manufactured by PerkinElmer Co., Ltd. under the conditions of a rate of temperature rise of 20° C./min and a nitrogen gas flow rate of 20 ml/min.

The weight average molecular weight of the alkali-soluble resin is preferably 5,000 or more, and more preferably 10,000 or more from the viewpoint of improving the water resistance of a printed matter. The weight average molecular weight of the alkali-soluble resin is preferably 100,000 or less and more preferably 50,000 or less from the viewpoint of increasing the solubility in an aqueous medium.

The weight average molecular weight can be measured by the gel permeation chromatography (GPC). As an example, the weight average molecular weight in terms of polystyrene can be determined by performing chromatography using Water 2690 (manufactured by Waters Corporation) as a GPC instrument, and PLgel, 5µ, and MIXED-D (manufactured by Polymer Laboratories Inc.) as a column under the conditions of a tetrahydrofuran as a developing solvent, a column temperature of 25° C., a flow rate of 1 ml/min, an RI detector, a sample injection concentration of 10 mg/ml, and an injection volume of 100 µl.

Examples of the alkali-soluble resin include acrylic copolymer resins, maleic acid-based copolymer resins, polyester resins obtained by condensation polymerization reaction, and polyurethane-based resins. Materials for synthesizing such alkali-soluble resins are disclosed, for example, in JP-A-2000-94825, and it is possible to use an acrylic copolymer resin, a maleic acid-based copolymer resin, a polyester-based resin, a polyurethane-based resin and the like that are obtained using the materials described in the publication. Further, it is also possible to use resins obtained using materials other than these materials. The alkali-soluble resins can be used singly or in combination of two or more types thereof.

As the acrylic copolymer resin, for example, one obtained by polymerizing a mixture of other monomers copolymerizable with an anionic group-containing monomer in a solvent in the presence of an ordinary radical generator (for example, benzoyl peroxide, tert-butyl peroxybenzoate, or azobisisobutyronitrile) can be used.

Examples of the anionic group-containing monomer include monomers having at least one type of anionic group selected from the group consisting of a carboxyl group, a sulfonic acid group, and a phosphonic acid group, and among these, monomers having a carboxyl group are particularly preferable.

Examples of the monomers having a carboxyl group include acrylic acid, methacrylic acid, crotonic acid, itaconic acid, maleic acid, fumaric acid, 2-carboxyethyl (meth)acrylate, 2-carboxypropyl (meth)acrylate, maleic anhydride, fumaric anhydride, and maleic acid half ester. Examples of the monomer having a sulfonic acid group include sulfoethyl methacrylate. Examples of the monomer having a phosphonic acid group include phosphonoethyl methacrylate.

The other monomers copolymerizable with an anionic group-containing monomer described above preferably include a hydrophobic group-containing monomer from the viewpoint of improving the adsorption on the pigment.

Examples of the hydrophobic group-containing monomer include, as a monomer having a long-chain alkyl group, alkyl esters having 8 or more carbon atoms of a radically polymerizable unsaturated carboxylic acid such as (meth) acrylic acid (for example, 2-ethylhexyl (meth)acrylate, octyl (meth)acrylate, lauryl (meth)acrylate, stearyl (meth)acrylate, 2-hydroxystearyl (meth)acrylate and the like), alkyl vinyl ethers having 8 or more carbon atoms (for example, dodecyl vinyl ether and the like), and vinyl esters of a fatty acid having 8 or more carbon atoms (for example, vinyl 2-ethylhexanoate, vinyl laurate, vinyl stearate and the like); as a monomer having an alicyclic hydrocarbon group, cyclohexyl (meth)acrylate and the like; and as a monomer having an aromatic hydrocarbon group, styrene-based monomers such as benzyl (meth)acrylate, styrene, α-methylstyrene, and vinyltoluene. The hydrophobic group-containing monomers can be used singly or in combination of two or more types thereof.

The other monomers copolymerizable with an anionic group-containing monomer described above can include a hydrophilic group-containing monomer from the viewpoint of suppressing aggregation of the alkali-soluble resin in an aqueous medium.

Examples of the hydrophilic group-containing monomer include, as a monomer having a (poly)oxyalkylene chain, esterified products of a (poly)alkylene glycol in which one terminal is capped with alkyl such as methoxy polyethylene glycol, methoxy polyethylene polypropylene glycol, ethoxy polyethylene glycol, ethoxy polyethylene polypropylene glycol, propoxy polyethylene glycol, and propoxy polyethylene polypropylene glycol, and a radically polymerizable unsaturated carboxylic acid such as (meth)acrylic acid, and ethylene oxide adducts and/or propylene oxide adducts of a radically polymerizable unsaturated carboxylic acid such as (meth)acrylic acid; as a basic group-containing monomer, vinylpyrrolidones such as 1-vinyl-2-pyrrolidone and 1-vinyl-3-pyrrolidone, vinylpyridines such as 2-vinylpyridine, 4-vinylpyridine, 5-methyl-2-vinylpyridine, and 5-ethyl-2-vinylpyridine, vinyl imidazoles such as 1-vinyl imidazole and 1-vinyl-2-methylimidazole, vinylpiperidines such as 3-vinylpiperidine and N-methyl-3-vinylpiperidine, nitrogen-containing derivatives of (meth)acrylic acid such as dimethylaminoethyl (meth)acrylate, diethylaminoethyl (meth)acrylate, tertiary-butylaminoethyl (meth)acrylate, (meth)acrylamide, N-methylol (meth)acrylamide, N-butoxymethyl (meth)acrylamide, N-methoxy (meth)acrylamide, N-ethoxy (meth)acrylamide, N-dimethylacrylamide, and N-propylacrylamide; as a monomer having a hydroxyl group, hydroxyalkyl esters of (meth)acrylic acid such as hydroxyethyl (meth)acrylate and hydroxypropyl (meth) acrylate; and as a monomer having an epoxy group, glycidyl (meth)acrylate. The hydrophilic group-containing monomers can be used singly or in combination of two or more types thereof.

Examples of the hydrophobic group-containing monomer and other copolymerizable monomers other than hydrophilic group-containing monomers include alkyl esters having less than 8 carbon atoms of (meth)acrylic acid such as methyl (meth)acrylate, ethyl (meth)acrylate, propyl (meth)acrylate, isopropyl (meth)acrylate, butyl (meth)acrylate, and hexyl (meth)acrylate. The hydrophobic group-containing monomers and other copolymerizable monomers other than hydrophilic group-containing monomers can be used singly or in combination of two or more types thereof.

<Surfactant>

The surfactant of the present invention contains a surfactant (A) having an HLB value of 3 or more and less than 10, and a surfactant (B) having an HLB value of 10 or more and 20 or less. Here, the HLB value is an index indicating the degree of hydrophilicity and lipophilicity of surfactant and is calculated by the Griffin's method. The HLB value indicates that the lipophilicity is higher as the HLB value is smaller, and the hydrophilicity is higher as the HLB value is larger. The surfactants (A) and (B) may be used singly or in combination of two or more types thereof.

As the surfactants (A) and (B), a known surfactant used in an aqueous inkjet ink composition can be used without particular limitation as long as each of the HLB values is satisfied. Examples thereof include nonionic surfactants, cationic surfactants, anionic surfactants, and betaine surfactants. Specific examples of the surfactant include silicone-based surfactants, fluorine-based surfactants, and acetylene-based surfactants. Among them, an acetylene-based surfactant is preferable from the viewpoint of improving ejection stability and cissing resistance.

Examples of the surfactant (A) include trade name: "SURFYNOL 104E", "SURFYNOL 104H", "SURFYNOL 104A", "SURFYNOL 104BC", "SURFYNOL 104DPM", "SURFYNOL 104PA", "SURFYNOL 104PG-50", "SURFYNOL 420", "SURFYNOL 440", and "OLFINEE1004" (as described above, manufactured by Nissin Chemical Co., Ltd.).

Examples of the surfactant (B) include trade name: "SURFYNOL 465", "SURFYNOL 485", "OLFINE E1010", and "OLFINE E1020" (as described above, manufactured by Nissin Chemical Co., Ltd.).

<Water-Soluble Solvent>

The water-soluble solvent of the present invention has a boiling point of 170° C. or more and 250° C. or less at 1 atm.

As the water-soluble solvent, a known water-soluble solvent used in an aqueous inkjet ink composition can be used without particular limitation as long as the boiling point thereof is 170° C. or more and 250° C. or less at 1 atm. Examples thereof include monoalcohols, polyhydric alcohols, lower alkyl ethers of polyhydric alcohols, and nitrogen-containing compounds.

Examples of the water-soluble solvent include 1-octanol (boiling point: 195° C.), 2-ethylhexanol (boiling point: 184° C.), propylene glycol (boiling point: 188° C.), 1,2-butanediol (boiling point: 197° C.), ethylene glycol (boiling point: 197° C.), 3-methoxy-3-methyl-1-butanol (boiling point: 174° C.), diethylene glycol (boiling point: 245° C.), dipropylene glycol monomethyl ether (boiling point: 188° C.), dipropylene glycol dimethyl ether (boiling point: 175° C.), diethylene glycol monomethyl ether (boiling point: 194° C.), diethylene glycol monoethyl ether (boiling point: 196°

C.), diethylene glycol monobutyl ether (boiling point: 231° C.), N-methylpyrrolidone (202° C.), and 2-pyrrolidone (245° C.)

The aqueous inkjet ink composition of the present invention may contain a known solvent (other solvents) used in an aqueous inkjet ink composition other than the water-soluble solvent.

<Colloidal Silica>

The colloidal silica of the present invention is in a state in which silica particles represented by a chemical composition formula of $SiO_2$ are dispersed in a medium to form a colloid. Examples of the medium include water, methanol, ethanol, i-propyl alcohol, n-butanol, xylene, and dimethylformamide. Further, the colloidal silica may be one in which the surface of silica particles is modified with a surface treatment agent such as a silane compound. The colloidal silica can be used singly or in combination of two or more types thereof.

The colloidal silica preferably has an average particle size of 3 to 100 nm, and more preferably 5 to 30 nm. The average particle size is an average primary particle size, and is represented by a median diameter (D50) of a volume-based particle size distribution measured by a dynamic light scattering method. Examples of the shape of the colloidal silica include a particle shape, a chain shape, and a pearl necklace shape.

Examples of commercially available products of the colloidal silica include trade name: "SNOWTEX XS", "SNOWTEX S", "SNOWTEX 30", "SNOWTEX 50T", "SNOWTEX 30L", "SNOWTEX YL", "SNOWTEX ZL", "SNOWTEX MP1040", "SNOWTEX UP", "SNOWTEX PS-S", "SNOWTEX PS-M", "SNOWTEX OXS", "SNOWTEX OS", "SNOWTEX 0", "SNOWTEX 0-40", "SNOWTEX CL", "SNOWTEX OYL", "SNOWTEX OUP", "SNOWTEX PS-SO", "SNOWTEX PS-MO", "SNOWTEX NXS", "SNOWTEX NS", "SNOWTEX N", "SNOWTEX N-40", "SNOWTEX CXS", "SNOWTEX C", "SNOWTEX CM", "SNOWTEX AK", "SNOWTEX AK-L", "SNOWTEX AK-Y", "ORGANOSILICASOL EG-ST", "ORGANOSILICASOL PMG-ST", "ORGANOSILICASOL IPA-ST" (as described above, manufactured by Nissan Chemical Corporation), "Levasil CC151", "Levasil CC301", "Levasil CC401", and "Levasil CC503" (as described above, manufactured by Nouryon N.V.).

<Water>

The water of the present invention includes water as an aqueous medium contained in a pigment dispersion to be described later, water added to prepare the concentration of the aqueous inkjet ink composition of the present invention, and the like. Examples of the water include ion exchanged water, pure water, distilled water, and industrial water. The water can be used singly or in combination of two or more types thereof.

Hereinafter, the percentage of each component in the aqueous inkjet ink composition of the present invention will be described.

The percentage of the pigment in the aqueous inkjet ink composition of the present invention is preferably 1% by mass or more, and more preferably 2% by mass or more from the viewpoint of improving the print density of a printed matter, and is preferably 10% by mass or less, and more preferably 8% by mass or less from the viewpoint of improving ejection stability. However, when the pigment is a white pigment, the percentage of the white pigment in the aqueous inkjet ink composition of the present invention is preferably 4% by mass or more, and more preferably 8% by mass or more, and is preferably 30% by mass or less, and more preferably 20% by mass or less.

The content of the alkali-soluble resin is preferably 5 parts by mass or more, and more preferably 15 parts by mass or more relative to 100 parts by mass of the pigment from the viewpoint of increasing the dispersibility of the pigment. The content of the alkali-soluble resin is preferably 100 parts by mass or less, more preferably 80 parts by mass or less, and still more preferably 60 parts by mass or less relative to 100 parts by mass of the pigment from the viewpoint of reducing the viscosity of the aqueous inkjet composition.

The percentage of the surfactant (A) in the aqueous inkjet ink composition of the present invention is preferably 0.1% by mass or more, more preferably 0.2% by mass or more, and still more preferably 0.4% by mass or more from the viewpoint of improving ejection stability, and is preferably 3% by mass or less, and more preferably 2% by mass or less from the viewpoint of improving storage stability.

The percentage of the surfactant (B) in the aqueous inkjet ink composition of the present invention is preferably 0.1% by mass or more, more preferably 0.2% by mass or more, and still more preferably 0.4% by mass or more from the viewpoint of improving ejection stability and storage stability, and is preferably 3% by mass or less, and more preferably 2% by mass or less from the viewpoint of improving storage stability.

The percentage of the water-soluble solvent in the aqueous inkjet ink composition of the present invention is preferably 15% by mass or more, and more preferably 20% by mass or more from the viewpoint of improving ejection stability, and is preferably 60% by mass or less, and more preferably 50% by mass or less from the viewpoint of improving the drying property of the coating film.

The proportion of the colloidal silica in the aqueous inkjet ink composition of the present invention is 0.05% by mass or more and 2% by mass or less. The proportion of the colloidal silica in the aqueous inkjet ink composition of the present invention is preferably 0.1% by mass or more, and more preferably 0.3% by mass or more from the viewpoint of improving storage stability, ejection stability, and cissing resistance, and is preferably 1.5% by mass or less, more preferably 1.0% by mass or less, and still more preferably 0.8% by mass or less from the viewpoint of improving storage stability, mechanical stability, ejection stability, and cissing resistance.

The percentage of the water (including water contained in each component) in the aqueous inkjet ink composition of the present invention is preferably 40% by mass or more, and more preferably 50% by mass or more from the viewpoint of improving the drying property of the coating film, and is preferably 70% by mass or less, and more preferably 60% by mass or less from the viewpoint of improving election stability.

<Resin Emulsion>

The aqueous inkjet ink composition of the present invention preferably contains a resin emulsion from the viewpoint of improving the drying property of the coating film and cissing resistance. As the resin emulsion, known resin emulsions used in aqueous inkjet ink compositions can be used. Examples of the resin emulsion include an acrylic resin emulsion, a styrene-acrylic resin emulsion, a polyester-based resin emulsion, a polyurethane-based resin emulsion, a polyvinyl acetate-based resin emulsion, a polyvinyl chloride-based resin emulsion, a polybutadiene-based resin emulsion, and a polyolefin-based resin emulsion. In the resin emulsion, the glass transition temperature of the resin is preferably 20° C. or less from the viewpoint of improving the drying property of the coating film of a printed matter and the adhesion to the base material. For the glass transition temperature, the catalog value of the manufacturer is used as a reference. In a case where the catalog value is not obtained, the glass transition temperature is determined by differential scanning calorimetry (DSC). The glass transition temperature is usually calculated by the midpoint of the temperature range in which the glass transition occurs. The resin emulsions can be used singly or in combination of two or more types thereof.

The proportion of (resin) solids in the resin emulsion in the aqueous inkjet ink composition is preferably 1% by mass or more, and preferably 2% by mass or more from the viewpoint of improving print image quality and abrasion resistance, and is preferably 10% by mass or less, and more preferably 5% by mass or less from the viewpoint of improving print image quality and storage stability.

<Basic Compound>

The aqueous inkjet ink composition of the present invention preferably contains a basic compound from the viewpoint of dissolving the alkali-soluble resin. Examples of the basic compound include inorganic basic compounds such as sodium hydroxide and potassium hydroxide; and organic basic compounds such as ammonia, methylamine, ethylamine, monoethanolamine, N,N-dimethylethanolamine, N,N-diethylethanolamine, N,N-dibutylethanolamine, diethanolamine, N-methyldiethanolamine, triethanolamine, morpholine, N-methylmorpholine, and N-ethylmorpholine. The basic compounds can be used singly or in combination of two or more kinds thereof.

The percentage of the basic compound in the aqueous inkjet ink composition of the present invention can be an amount at which the alkali-soluble resin can be dissolved in a medium. The percentage is usually preferably 0.05% by mass or more, and more preferably 0.1% by mass or more from the viewpoint of increasing the dispersion stability of the alkali-soluble resin, and is preferably 1% by mass or less, and more preferably 0.5% by mass or less from the viewpoint of increasing the water resistance of a printed matter.

Additives such as a known resin, a resin emulsion, a wax emulsion, a pigment dispersant, a mildewproofing agent, a rust inhibitor, a thickener, an antioxidant, an ultraviolet absorber, a preservability improver, an antifoaming agent, and a pH adjuster can be further added to the aqueous inkjet ink composition of the present invention depending on the purpose.

<Method for Preparing Aqueous Inkjet Ink Composition>

The method for preparing (producing) the aqueous inkjet ink composition of the present invention is not particularly limited, and the above-mentioned components can be added in order or simultaneously and mixed. Examples thereof include method 1) in which an aqueous resin varnish in which an alkali-soluble resin is dissolved in water in the presence of the basic compound, a pigment, and if necessary, a pigment dispersant and the like are mixed, then a pigment dispersion (ink base) is prepared using various dispersers such as a ball mill, an attritor, a roll mill, a sand mill, and an agitator mill, and the remaining materials are further added to prepare an aqueous inkjet ink composition; and method (2) in which a pigment is dispersed by the above-mentioned method, then a resin-coated pigment in which an alkali-soluble resin is deposited on a pigment surface is obtained by, for example, an acid deposition method or an ion exchange method described in Republished patent WO 2005/116147, then the obtained resin-coated pigment is neutralized with a basic compound and redispersed in water using various dispersers (such as a high-speed stirrer), and the remaining materials are further added to prepare an aqueous inkjet ink composition.

The initial viscosity of the aqueous inkjet ink composition of the present invention after production is 2.0 to 15.0 mPa·s, preferably in a range of 3.0 to 12.0 mPa·s. The viscosity can be measured by, for example, an E-type viscometer (trade name "RE100L type viscometer" manufactured by Toki Sangyo Co., Ltd).

<Printed Matter>

The printed matter of the present invention is obtained by performing printing using the aqueous inkjet ink composition. Specifically, the printed matter of the present invention is obtained by applying (printing) the aqueous inkjet ink composition onto a base material using an inkjet printer.

Examples of the base material include non-absorbent print media such as coated paper such as art paper, inkjet dedicated paper, and inkjet glossy paper, and plastic base materials such as a polypropylene film and a polyvinyl chloride sheet; uncoated paper such as plain paper and offset paper; and a fabric of, for example, cotton. In particular, the aqueous inkjet ink composition of the present invention is excellent in cissing resistance, and thus is suitable for a plastic base material among non-absorbent print media.

<Inkjet Printing Method>

As the inkjet printing method of the present invention, conventionally known conditions can be appropriately adopted. Examples thereof include a method in which inkjet printing is performed by housing the aqueous inkjet ink composition in an ink cartridge, attaching the ink cartridge to an inkjet recording apparatus of, for example, a single pass system, and ejecting the aqueous inkjet ink composition from a nozzle to a base material.

Examples

Hereinafter, the present invention will be described with reference to Examples and the like, but the present invention is not limited thereto.

Production Example 1

<Production of Pigment Dispersion (Black Ink Base)>

An alkali-soluble resin (acrylic acid/n-butyl acrylate/benzyl methacrylate/styrene copolymer), a weight average molecular weight of 30,000, an acid value of 185 mg KOH/g, a glass transition temperature of 40° C.) (20 parts by mass) was dissolved in a mixed solution of 2.5 parts by mass of potassium hydroxide and 77.5 parts by mass of water to obtain an aqueous resin varnish having a solid content of the alkali-soluble resin of 20% by mass. Then, 64.3 parts by mass of water was added to and mixed with 23.7 parts by mass of the aqueous resin varnish to prepare a resin varnish for pigment dispersion. To this resin varnish for pigment dispersion, 12 parts by mass of carbon black (trade name: "Printex 90", manufactured by Degussa AG) as a pigment was further added. The mixture was stirred and mixed and then milled with a wet circulation mill to produce a black pigment dispersion (black ink base) of Production Example 1.

Production Examples 2 to 4

<Production of Pigment Dispersion (Yellow, Magenta, and Cyan Ink Bases)>

A yellow pigment dispersion (yellow ink base) of Production Example 2, a magenta pigment dispersion (magenta ink base) of Production Example 3, and a cyan pigment dispersion (cyan ink base) of Production Example 4 were produced in the same method as in Production Example 1 except that a yellow pigment (trade name: Novoperm Yellow 4G01, manufactured by Clariant), a magenta pigment (trade name: "Inkjet magenta E5B02", manufactured by Clariant), or a cyan pigment (trade name: Heliogen Blue L 7101 F, manufactured by BASF SE) was used instead of the carbon black (trade name: "Printex 90", manufactured by Degussa AG) described in Production Example 1.

Production Example 5

<Production of Pigment Dispersion (White Ink Base)>

Water (20.0 parts by mass) was added to and mixed with 40.0 parts by mass of the aqueous resin varnish described in Production Example 1 to prepare a resin varnish for pigment dispersion. To this resin varnish for pigment dispersion, 40 parts by mass of titanium oxide (trade name: "R-960", manufactured by DuPont) as a pigment was further added. The mixture was stirred and mixed and then milled with a wet circulation mill to produce a white pigment dispersion (white ink base) of Production Example 5.

Example 1

<Production of Aqueous Inkjet Ink Composition>

The black pigment dispersion (black ink base), propylene glycol as a water-soluble solvent, an acetylene-based surfactant (trade name: "OLFINE E1004", solid content (active ingredient): 100%, HLB: 8, manufactured by Nissin Chemical Co., Ltd.) as a surfactant (A), an acetylene-based surfactant (trade name: "OLFINE E1010", solid content (active ingredient): 100%, HLB: 13, manufactured by Nissin Chemical Co., Ltd.) as a surfactant (B), colloidal silica (trade name: "SNOWTEX 30", solid content: 30%, particle size: 12 nm, Na' stable alkaline sol, manufactured by Nissan Chemical Industries, Ltd.) as colloidal silica, a styrene-acrylic resin emulsion (trade name: Neocryl A-1092, solid content: 48.5%, glass transition temperature: 6° C., manufactured by Koninklijke DSM N.V.) as a resin emulsion, and water were stirred and mixed so as to have the mass ratio in Table 1, thereby producing an aqueous inkjet ink composition of Example 1.

Examples 2 to 26 and Comparative Examples 1 to 9

<Production of Aqueous Inkjet Ink Composition>

The aqueous inkjet ink compositions of Examples and Comparative Examples were produced in the same method as in Example 1 except that the raw materials used and the amounts thereof were changed as shown in Table 1-4 in Examples and Comparative Examples.

<Evaluation of Aqueous Inkjet Ink Composition>

Evaluation was performed by the following method, and the results are shown in Tables 1 to 4. In the following evaluation, an ink composition having at least one × is determined to be unacceptable.

<Storage Stability>

Each of the aqueous inkjet ink composition produced above was placed in a glass bottle, and the viscosity (mPa·s) at 25° C. was measured using a viscometer ("RE100 L type" manufactured by Toki Sangyo Co., Ltd. Then, the glass bottle was tightly stopped and stored at 60° C. for 1 month, and the viscosity (25° C.) after storage was measured with a viscometer. The storage stability was evaluated the rate of viscosity change (60° C., (viscosity after 1 month−viscosity before storage)/viscosity before storage).

[Evaluation Criteria of Storage Stability]

○: Rate of viscosity change is less than 5%.

Δ: Rate of viscosity change is 5% or more and less than 10%.

×: Rate of viscosity change is 10% or more.

<Mechanical Stability>

Each of the aqueous inkjet ink compositions produced above was placed in a plastic container, and circularly fed for 500 cycles in a water bath at 25° C. with a diaphragm pump (NF60, manufactured by KNF). The circulated ink was filtered through a polyester mesh having a mesh size of 150, and the residual was visually evaluated.

[Evaluation Criteria of Mechanical Stability]

○: There is no residual.

Δ: Slight residual is observed.

×: Large amount of residual is observed.

<Ejection Stability>

The aqueous inkjet ink composition produced above was packed in a cartridge of an inkjet printer ("PX105", manufactured by Seiko Epson Corp.), printing was performed on photo paper ("GL-101A450", manufactured by Canon Inc.), and ejection stability was evaluated. [Evaluation criteria of ejection stability]

○: There is almost no printing disorder, and ejection can be stably performed.

Δ: There is some printing disorder, but ejection can be performed.

×: There is printing disorder, and ejection cannot be stably performed.

<Drying Property of Coating Film>

The aqueous inkjet ink composition produced above was packed in a cartridge of an inkjet printer ("PX105", manufactured by Seiko Epson Corp.), printing was performed on OK top coat paper (manufactured by Oji Paper Co., Ltd.), the printed matter was allowed to stand at 80° C. for 3 minutes to dry the ink, and a print part was rubbed with a cotton swab to evaluate the drying property of the coating film.

[Evaluation Criteria of Drying Property of Coating Film]

○: Ink does not adhere to cotton swab at all.

Δ: Small amount of ink adheres to cotton swab.

×: Large amount of ink adheres cotton swab.

<Cissing Resistance>

The aqueous inkjet ink composition produced above was applied onto an OPP film (P2161, 25 μm, manufactured by Toyobo Co., Ltd.) with a 0.15 mm bar coater, and visually observed to evaluate cissing resistance.

[Evaluation Criteria of Cissing Resistance]

○: Application can be uniformly performed without cissing.

Δ: There is slight cissing, but application can be performed.

×: Cissing occurs, and uniform application cannot be performed apparently.

TABLE 1

| | | | Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 |
| Aqueous inkjet ink composition | Pigment dispersion | Black ink base | 34.0 | — | — | — | — | 34.0 | 34.0 | 34.0 | 34.0 | 34.0 | 34.0 |
| | | Yellow ink base | — | 34.0 | — | — | — | — | — | — | — | — | — |
| | | Magenta ink base | — | — | 34.0 | — | — | — | — | — | — | — | — |
| | | Cyan ink base | — | — | — | 25.0 | — | — | — | — | — | — | — |
| | | White ink base | — | — | — | — | 25.0 | — | — | — | — | — | — |
| | Water-soluble solvent | Propylene glycol | 35.0 | 35.0 | 35.0 | 35.0 | 35.0 | 50.0 | 20.0 | — | — | 35.0 | 35.0 |
| | | Dipropylene glycol dimethyl ether | — | — | — | — | — | — | — | 35.0 | — | — | — |
| | | Diethylene glycol monobutyl ether | — | — | — | — | — | — | — | — | 35.0 | — | — |
| | | Ethylene glycol monomethyl ether | — | — | — | — | — | — | — | — | — | — | — |
| | | Tripropylene glycol monobutyl ether | — | — | — | — | — | — | — | — | — | — | — |
| | Surfactant (A) | OLFINE E1004 | 0.5 | 0.5 | 0.5 | 0.5 | 0.5 | 0.5 | 0.5 | 0.5 | 0.5 | 1.0 | 0.1 |
| | | SURFYNOL 104E | — | — | — | — | — | — | — | — | — | — | — |
| | Surfactant (B) | OLFINE E1010 | 0.5 | 0.5 | 0.5 | 0.5 | 0.5 | 0.5 | 0.5 | 0.5 | 0.5 | 0.5 | 0.5 |
| | | SURFYNOL 485 | — | — | — | — | — | — | — | — | — | — | — |
| | Colloidal silica (solid content) | SNOWTEX 30 | 0.5 | 0.5 | 0.5 | 0.5 | 0.5 | 0.5 | 0.5 | 0.5 | 0.5 | 0.5 | 0.5 |
| | | SNOWTEX XS | — | — | — | — | — | — | — | — | — | — | — |
| | | SNOWTEX O | — | — | — | — | — | — | — | — | — | — | — |
| | | SNOWTEX N | — | — | — | — | — | — | — | — | — | — | — |
| | | SNOWTEX C | — | — | — | — | — | — | — | — | — | — | — |
| | | Levasil CC151 | — | — | — | — | — | — | — | — | — | — | — |
| | | Levasil CC301 | — | — | — | — | — | — | — | — | — | — | — |
| | | Levasil CC401 | — | — | — | — | — | — | — | — | — | — | — |
| | | Levasil CC503 | — | — | — | — | — | — | — | — | — | — | — |
| | Resin emulsion (solid content) | Neocryl A-1092 | 2.0 | 2.0 | 2.0 | 2.0 | 2.0 | 2.0 | 2.0 | 2.0 | 2.0 | 2.0 | 2.0 |
| | Water (including water of colloidal silica and resin emulsion) | | 27.5 | 27.5 | 27.5 | 36.5 | 36.5 | 12.5 | 42.5 | 27.5 | 27.5 | 27.0 | 27.9 |
| | Total | | 100.0 | 100.0 | 100.0 | 100.0 | 100.0 | 100.0 | 100.0 | 100.0 | 100.0 | 100.0 | 100.0 |
| Evaluation results | Storage stability | | ○ | ○ | ○ | ○ | ○ | ○ | ○ | Δ | ○ | Δ | ○ |
| | Mechanical stability | | ○ | ○ | ○ | ○ | ○ | ○ | ○ | ○ | ○ | ○ | ○ |
| | Ejection stability | | ○ | ○ | ○ | ○ | ○ | ○ | Δ | Δ | ○ | ○ | Δ |
| | Drying property of coating film | | ○ | ○ | ○ | ○ | ○ | Δ | ○ | ○ | Δ | ○ | ○ |
| | Cissing resistance | | ○ | ○ | ○ | ○ | ○ | ○ | ○ | ○ | ○ | ○ | ○ |

TABLE 2

| | | | Example | | | | | | | | |
|---|---|---|---|---|---|---|---|---|---|---|---|
| | | | 12 | 13 | 14 | 15 | 16 | 17 | 18 | 19 | 20 |
| Aqueous inkjet ink composition | Pigment dispersion | Black ink base | 34.0 | 34.0 | 34.0 | 34.0 | 34.0 | 34.0 | 34.0 | 34.0 | 34.0 |
| | | Yellow ink base | — | — | — | — | — | — | — | — | — |
| | | Magenta ink base | — | — | — | — | — | — | — | — | — |
| | | Cyan ink base | — | — | — | — | — | — | — | — | — |
| | | White ink base | — | — | — | — | — | — | — | — | — |
| | Water-soluble solvent | Propylene glycol | 35.0 | 35.0 | 35.0 | 35.0 | 35.0 | 35.0 | 35.0 | 35.0 | 40.0 |
| | | Dipropylene glycol dimethyl ether | — | — | — | — | — | — | — | — | — |
| | | Diethylene glycol monobutyl ether | — | — | — | — | — | — | — | — | — |
| | | Ethylene glycol monomethyl ether | — | — | — | — | — | — | — | — | — |
| | | Tripropylene glycol monobutyl ether | — | — | — | — | — | — | — | — | — |
| | Surfactant (A) | OLFINE E1004 | — | 0.5 | 0.5 | 0.5 | 0.5 | 0.5 | 0.5 | 0.5 | 0.5 |
| | | SURFYNOL 104E | 1.0 | — | — | — | — | — | — | — | — |
| | Surfactant (B) | OLFINE E1010 | 0.5 | 1.0 | 0.1 | — | 0.5 | 0.5 | 0.5 | 0.5 | 0.5 |
| | | SURFYNOL 485 | — | — | — | 0.5 | — | — | — | — | — |
| | Colloidal silica (solid content) | SNOWTEX 30 | 0.5 | 0.5 | 0.5 | 0.5 | — | — | — | — | 0.5 |
| | | SNOWTEX XS | — | — | — | — | 0.5 | — | — | — | — |
| | | SNOWTEX O | — | — | — | — | — | 0.5 | — | — | — |
| | | SNOWTEX N | — | — | — | — | — | — | 0.5 | — | — |
| | | SNOWTEX C | — | — | — | — | — | — | — | 0.5 | — |
| | | Levasil CC151 | — | — | — | — | — | — | — | — | — |
| | | Levasil CC301 | — | — | — | — | — | — | — | — | — |
| | | Levasil CC401 | — | — | — | — | — | — | — | — | — |
| | | Levasil CC503 | — | — | — | — | — | — | — | — | — |
| | Resin emulsion (solid content) | Neocryl A-1092 | 2.0 | 2.0 | 2.0 | 2.0 | 2.0 | 2.0 | 2.0 | 2.0 | — |
| | Water (including water of colloidal silica and resin emulsion) | | 27.0 | 27.0 | 27.9 | 27.5 | 27.5 | 27.5 | 27.5 | 27.5 | 24.5 |
| | Total | | 100.0 | 100.0 | 100.0 | 100.0 | 100.0 | 100.0 | 100.0 | 100.0 | 100.0 |

TABLE 2-continued

|  |  | Example |  |  |  |  |  |  |  |  |
|---|---|---|---|---|---|---|---|---|---|---|
|  |  | 12 | 13 | 14 | 15 | 16 | 17 | 18 | 19 | 20 |
| Evaluation results | Storage stability | ○ | ○ | Δ | ○ | ○ | ○ | ○ | ○ | ○ |
|  | Mechanical stability | ○ | ○ | ○ | ○ | Δ | ○ | ○ | ○ | ○ |
|  | Ejection stability | ○ | ○ | Δ | ○ | ○ | ○ | ○ | ○ | ○ |
|  | Drying property of coating film | ○ | ○ | ○ | ○ | ○ | ○ | ○ | ○ | Δ |
|  | Cissing resistance | ○ | ○ | ○ | ○ | ○ | ○ | ○ | ○ | Δ |

TABLE 3

|  |  |  | Example |  |  |  |  |  |
|---|---|---|---|---|---|---|---|---|
|  |  |  | 21 | 22 | 23 | 24 | 25 | 26 |
| Aqueous inkjet ink composition | Pigment dispersion | Black ink base | 34.0 | 34.0 | 34.0 | 34.0 | 34.0 | 34.0 |
|  |  | Yellow ink base | — | — | — | — | — | — |
|  |  | Magenta ink base | — | — | — | — | — | — |
|  |  | Cyan ink base | — | — | — | — | — | — |
|  |  | White ink base | — | — | — | — | — | — |
|  | Water-soluble solvent | Propylene glycol | 35.0 | 35.0 | 35.0 | 35.0 | 35.0 | 35.0 |
|  |  | Dipropylene glycol dimethyl ether | — | — | — | — | — | — |
|  |  | Diethylene glycol monobutyl ether | — | — | — | — | — | — |
|  |  | Ethylene glycol monomethyl ether | — | — | — | — | — | — |
|  |  | Tripropylene glycol monobutyl ether | — | — | — | — | — | — |
|  | Surfactant (A) | OLFINE E1004 | 0.5 | 0.5 | 0.5 | 0.5 | 0.5 | 0.5 |
|  |  | SURFYNOL 104E | — | — | — | — | — | — |
|  | Surfactant (B) | OLFINE E1010 | 0.5 | 0.5 | 0.5 | 0.5 | 0.5 | 0.5 |
|  |  | SURFYNOL 485 | — | — | — | — | — | — |
|  | Colloidal silica (solid content) | SNOWTEX 30 | — | — | — | — | — | — |
|  |  | SNOWTEX XS | — | — | — | — | — | — |
|  |  | SNOWTEX O | — | — | — | — | — | — |
|  |  | SNOWTEX N | — | — | — | — | — | — |
|  |  | SNOWTEX C | — | — | — | — | — | — |
|  |  | Levasil CC151 | 0.5 | — | — | — | 2.0 | 0.1 |
|  |  | Levasil CC301 | — | 0.5 | — | — | — | — |
|  |  | Levasil CC401 | — | — | 0.5 | — | — | — |
|  |  | Levasil CC503 | — | — | — | 0.5 | — | — |
|  | Resin emulsion (solid content) | Neocryl A-1092 | 2.0 | 2.0 | 2.0 | 2.0 | 2.0 | 2.0 |
|  | Water (including water of colloidal silica and resin emulsion) |  | 27.5 | 27.5 | 27.5 | 27.5 | 26.0 | 27.9 |
|  | Total |  | 100.0 | 100.0 | 100.0 | 100.0 | 100.0 | 100.0 |
| Evaluation results | Storage stability |  | ○ | ○ | ○ | ○ | Δ | ○ |
|  | Mechanical stability |  | ○ | ○ | ○ | ○ | Δ | ○ |
|  | Ejection stability |  | ○ | ○ | ○ | ○ | Δ | ○ |
|  | Drying property of coating film |  | ○ | ○ | ○ | ○ | ○ | ○ |
|  | Cissing resistance |  | ○ | ○ | ○ | ○ | Δ | A |

TABLE 4

|  |  |  | Comparative Example |  |  |  |  |  |  |  |  |
|---|---|---|---|---|---|---|---|---|---|---|---|
|  |  |  | 1 | 2 | 3 | 4 | 5 | 6 | 7 | 8 | 9 |
| Aqueous inkjet ink composition | Pigment dispersion | Black ink base | 34.0 | 34.0 | 34.0 | 34.0 | 34.0 | 34.0 | 34.0 | 34.0 | 34.0 |
|  |  | Yellow ink base | — | — | — | — | — | — | — | — | — |
|  |  | Magenta ink base | — | — | — | — | — | — | — | — | — |
|  |  | Cyan ink base | — | — | — | — | — | — | — | — | — |
|  |  | White ink base | — | — | — | — | — | — | — | — | — |
|  | Water-soluble solvent | Propylene glycol | — | — | — | 35.0 | 35.0 | 35.0 | 35.0 | 35.0 | 35.0 |
|  |  | Dipropylene glycol dimethyl ether | — | — | — | — | — | — | — | — | — |
|  |  | Diethylene glycol monobutyl ether | — | — | — | — | — | — | — | — | — |
|  |  | Ethylene glycol monomethyl ether | — | 35.0 | — | — | — | — | — | — | — |
|  |  | Tripropylene glycol monobutyl ether | — | — | 35.0 | — | — | — | — | — | — |

TABLE 4-continued

|  |  | Comparative Example | | | | | | | | |
|---|---|---|---|---|---|---|---|---|---|---|
|  |  | 1 | 2 | 3 | 4 | 5 | 6 | 7 | 8 | 9 |
| Surfactant (A) | OLFINE E1004 | 0.5 | 0.5 | 0.5 | 0.5 | 0.5 | — | — | 0.5 | 0.5 |
|  | SURFYNOL 104E | — | — | — | — | 1.0 | — | — | — | — |
| Surfactant (B) | OLFINE E1010 | 0.5 | 0.5 | 0.5 | — | — | 0.5 | 0.5 | 0.5 | 0.5 |
|  | SURFYNOL 485 | — | — | — | — | — | — | 0.5 | — | — |
| Colloidal silica (solid content) | SNOWTEX 30 | 0.5 | 0.5 | 0.5 | 0.5 | 0.5 | 0.5 | 0.5 | — | — |
|  | SNOWTEX XS | — | — | — | — | — | — | — | — | — |
|  | SNOWTEX O | — | — | — | — | — | — | — | — | — |
|  | SNOWTEX N | — | — | — | — | — | — | — | — | — |
|  | SNOWTEX C | — | — | — | — | — | — | — | — | — |
|  | Levasil CC151 | — | — | — | — | — | — | — | 2.5 | — |
|  | Levasil CC301 | — | — | — | — | — | — | — | — | — |
|  | Levasil CC401 | — | — | — | — | — | — | — | — | — |
|  | Levasil CC503 | — | — | — | — | — | — | — | — | — |
| Resin emulsion (solid content) | Neocryl A-1092 | 2.0 | 2.0 | 2.0 | 2.0 | 2.0 | 2.0 | 2.0 | 2.0 | 2.0 |
| Water (including water of colloidal silica and resin emulsion) | | 62.5 | 27.5 | 27.5 | 28.0 | 27.0 | 28.0 | 27.5 | 25.5 | 28.0 |
| | Total | 100.0 | 100.0 | 100.0 | 100.0 | 100.0 | 100.0 | 100.0 | 100.0 | 100.0 |
| Evaluation results | Storage stability | ○ | X | ○ | △ | △ | ○ | ○ | △ | ○ |
|  | Mechanical stability | X | ○ | ○ | ○ | ○ | ○ | ○ | X | ○ |
|  | Ejection stability | X | X | X | X | X | X | X | △ | ○ |
|  | Drying property of coating film | ○ | ○ | X | ○ | ○ | ○ | ○ | ○ | ○ |
|  | Cissing resistance | ○ | ○ | ○ | ○ | ○ | ○ | ○ | X | X |

In Table 1-4, propylene glycol has a boiling point of 188° C.;
dipropylene glycol dimethyl ether has a boiling point of 175° C.;
diethylene glycol monobutyl ether has a boiling point of 231° C.;
ethylene glycol monomethyl ether has a boiling point of 124° C.; and
tripropylene glycol monobutyl ether has a boiling point of 274° C.

In Table 1-4,
OLFINE E1004 is an acetylene-based surfactant (solid content (active ingredient): 100%, HLB: 8, manufactured by Nissin Chemical Co., Ltd.);
SURFYNOL 104E is an acetylene-based surfactant (solid content (active ingredient): 50%, HLB: 4, manufactured by Nissin Chemical Co., Ltd.);
OLFINE E1010 is an acetylene-based surfactant (solid content (active ingredient): 100%, HLB: 13, manufactured by Nissin Chemical Co., Ltd.);
SURFYNOL 485 is an acetylene-based surfactant (solid content (active ingredient): 100%, HLB: 17, manufactured by Nissin Chemical Co., Ltd.);
SNOWTEX 30 is colloidal silica (solid content: 30%, particle size: 12 nm, $Na^+$ stable alkaline sol, manufactured by Nissan Chemical Corporation);
SNOWTEX XS is colloidal silica (solid content: 20%, particle size: 5 nm, $Na^+$ stable alkaline sol, manufactured by Nissan Chemical Corporation);
SNOWTEX O is colloidal silica (solid content: 20%, particle size: 12 nm, acidic sol, manufactured by Nissan Chemical Corporation);
SNOWTEX N is colloidal silica (solid content: 20%, particle size: 12 nm, $NH_4^+$ stable alkaline sol, manufactured by Nissan Chemical Corporation);
SNOWTEX C is colloidal silica (solid content: 20%, particle size: 12 nm, neutral stable sol, manufactured by Nissan Chemical Corporation);
Levasil CC151 is colloidal silica (solid content: 15%, particle size: 5 nm, silane-modified colloidal silica, manufactured by Nouryon N.V.);
Levasil CC301 is colloidal silica (solid content: 28%, particle size: 7 nm, silane-modified colloidal silica, manufactured by Nouryon N.V.);
Levasil CC401 is colloidal silica (solid content: 37%, particle size: 12 nm, silane-modified colloidal silica, manufactured by Nouryon N.V.);
Levasil CC503 is colloidal silica (solid content: 50%, particle size: 34 nm, silane-modified colloidal silica, manufactured by Nouryon N.V.); and
Neocryl A-1092 (solid content: 48.5%, styrene-acrylic emulsion, manufactured by Koninklijke DSM N.V., glass transition temperature: 6° C.)

What is claimed is:

1. An aqueous inkjet ink composition comprising a pigment, an alkali-soluble resin, a surfactant, a water-soluble solvent, colloidal silica, and water,
   wherein the surfactant contains a surfactant (A) having an HLB value of 3 or more and less than 10, and a surfactant (B) having an HLB value of 10 or more and 20 or less,
   the water-soluble solvent represents 15% by mass or more and 60% by mass or less in the aqueous inkjet ink composition, and has a boiling point of 170° C. or more and 250° C. or less at 1 atm, and
   a proportion of the colloidal silica is 0.05% by mass or more and 2% by mass or less in the aqueous inkjet ink composition.

2. The aqueous inkjet ink composition according to claim 1, wherein the water-soluble solvent is one or more solvents selected from the group consisting of monoalcohols, polyhydric alcohols, lower alkyl ethers of polyhydric alcohols, and nitrogen-containing compounds.

3. The aqueous inkjet ink composition according to claim 1, further comprising a resin emulsion.

4. A printed matter obtained by performing printing using the aqueous inkjet ink composition according to claim 1.

5. An inkjet printing method, comprising printing an object to be printed on a non-absorbent print medium using the aqueous inkjet ink composition according to claim 1.

6. The aqueous inkjet ink composition according to claim 1, wherein the pigment contains a yellow pigment, a magenta pigment, a cyan pigment, or a black pigment.

7. The aqueous inkjet ink composition according to claim 1, wherein the surfactant (A) is an acetylene-based surfactant, and the surfactant (B) is an acetylene-based surfactant.

\* \* \* \* \*